US009976463B2

(12) United States Patent
Dementhon (10) Patent No.: US 9,976,463 B2
(45) Date of Patent: May 22, 2018

(54) AMMONIA STORAGE STRUCTURE AND ASSOCIATED SYSTEMS

(71) Applicant: AAQIUS & AAQIUS SA, Geneva (CH)

(72) Inventor: Jean-Baptiste Dementhon, Paris (FR)

(73) Assignee: AAQIUS & AAQIUS SA, Geneva (CH)

( * ) Notice: Subject to any disclaimer, the term of this patent is extended or adjusted under 35 U.S.C. 154(b) by 0 days. days.

(21) Appl. No.: 14/783,501

(22) PCT Filed: Apr. 11, 2014

(86) PCT No.: PCT/EP2014/057441
§ 371 (c)(1),
(2) Date: Oct. 9, 2015

(87) PCT Pub. No.: WO2014/167123
PCT Pub. Date: Oct. 16, 2014

(65) Prior Publication Data
US 2016/0053651 A1 Feb. 25, 2016

(30) Foreign Application Priority Data
Apr. 12, 2013 (FR) ...................................... 13 53367

(51) Int. Cl.
*F01N 11/00* (2006.01)
*F01N 3/20* (2006.01)
*C01C 1/00* (2006.01)

(52) U.S. Cl.
CPC ............ *F01N 3/2066* (2013.01); *C01C 1/006* (2013.01); *F01N 3/2006* (2013.01);
(Continued)

(58) Field of Classification Search
CPC . C01C 1/006; F01N 2240/25; F01N 2610/02; F01N 2610/12; F01N 2610/1406; F01N 2610/1413; F01N 2610/142
See application file for complete search history.

(56) References Cited

U.S. PATENT DOCUMENTS 7,964,163 B2   6/2011   Johannessen et al.
8,088,201 B2   1/2012   Johannessen
(Continued)

FOREIGN PATENT DOCUMENTS

EP   2236784 A1   10/2010
EP   2366448 A1 * 9/2011   ............. B01D 53/90
(Continued)

*Primary Examiner* — Jonathan Matthias
(74) *Attorney, Agent, or Firm* — Womble Bond Dickinson (US) LLP (57) ABSTRACT

The disclosure relates to an ammonia storage structure in particular for the selective catalytic reduction of nitrogen oxides in the exhaust gases of combustion vehicles, including at least one storage material in which the ammonia can be stored, where the structure includes at least two different storage portions, each storage portion containing a storage material, and not all the storage materials of the different storage portions being identical. The disclosure also relates to an ammonia storage and removal system of a vehicle that includes a storage chamber, including such a storage structure. A selective catalytic reduction system for internal combustion engine exhaust gases, includes such an ammonia storage system and to a module for feeding ammonia into the exhaust gases.

33 Claims, 5 Drawing Sheets

(52) U.S. Cl.
 CPC ...... *F01N 2610/02* (2013.01); *F01N 2610/10* (2013.01); *F01N 2610/12* (2013.01); *F01N 2610/1406* (2013.01); *Y02A 50/2325* (2018.01); *Y02T 10/24* (2013.01)

(56) References Cited

U.S. PATENT DOCUMENTS

| | | |
|---|---|---|
| 8,491,842 B2 | 7/2013 | Johansen et al. |
| 8,551,219 B2 | 10/2013 | Johannessen et al. |
| 8,728,422 B2 | 5/2014 | Audouin et al. |
| 9,243,945 B2 | 1/2016 | Audouin |
| 2010/0062296 A1 | 3/2010 | Johannessen |
| 2010/0086467 A1* | 4/2010 | Johansen ................ C01C 1/006 423/352 |
| 2012/0045379 A1* | 2/2012 | Johannessen .......... B01D 53/90 423/235 |
| 2013/0287656 A1 | 10/2013 | Audouin et al. |

FOREIGN PATENT DOCUMENTS

| | | |
|---|---|---|
| JP | 2012-047156 A | 3/2012 |
| JP | 2012052476 A | 3/2012 |
| WO | WO-2011/103968 A2 | 9/2011 |

\* cited by examiner

Matériaux d'absorption en contact, le NH₃ circulant par diffusion d'un mileu poreux à un autre par diffusion en milieu poreux

FIG. 3a

Matériaux d'absorption, le NH₃ circulant de l'un à l'autre par un conduit obturable par une vanne

FIG. 3c

Matériaux d'absorption en contact, le NH$_3$ circulant par diffusion d'un mileu poreux à un autre par diffusion en milieu poreux

AMMONIA STORAGE STRUCTURE AND ASSOCIATED SYSTEMS

CROSS-REFERENCE TO RELATED APPLICATIONS

This application is a National Phase Entry of International Application Serial No. PCT/EP2014/057441 filed on Apr. 11, 2014, which claims priority to French Patent Application Serial No. 1353367, filed on Apr. 12, 2013, both of which are incorporated by reference herein.

BACKGROUND AND SUMMARY

The invention generally relates to the storage of gas in solids. This type of storage generally stores gas at storage pressures less than those found in the case of purely gaseous storage. Applications of this type of storage are diverse and relate for example to the use of hydrogen in a fuel cell intended for the production of electricity, or the use of ammonia in applications for reduction of nitrogen oxides NOx by selective catalytic reduction (SCR), especially for reduction of pollutant emissions by the internal combustion engines, diesel engines in particular. The invention relates to an ammonia storage structure especially for selective catalytic reduction of nitrogen oxides in the exhaust gas of combustion vehicles, comprising at least one storage material in which the ammonia can be stored. The invention also relates to systems comprising such a structure.

The reduction of pollutant emissions linked to transport has been the object of development for nearly thirty years. The progressive rise in the severity of emission limits for the four regulated pollutants (CO, HC, $NO_x$, particles) has significantly improved the quality of air especially in large conurbations.

The growing use of cars means continuing efforts to further reduce these pollutant emissions. A decrease in tolerance relative to European emission thresholds is expected in 2014 in terms of steps for the introduction of the standard Euro6. Such measures aim to reduce local pollution. In this context, it is preferable to reduce nitrogen oxides (NOx) in a poor mixture, that is, a mixture comprising oxygen in excess.

Also, fuel consumption, in direct connection with CO2 emissions, has been propelled in a few years to a major preoccupation level of the automobile. So a ruling has been put in place at the European level from 2012 to limit CO2 emissions of particular vehicles. It is already accepted that this limit will be lowered regularly over decades to come. This double problem: reduction of local pollution ($NO_x$), and reduction in fuel consumption ($CO_2$), is particularly restrictive for diesel engines the combustion of which in poor mixture is accompanied by $NO_x$ emissions difficult to treat.

In this context, SCR post-processing technology ("selective catalytic reduction") is used as much for particular vehicles as for vehicles related to transport of merchandise. An SCR system generally reduces nitrogen oxides NOx by selective catalytic reduction. It is possible to operate an engine optimally at yield at a cost of substantial NOx emissions, these $NO_x$ emissions then being treated in the exhaust by an SCR system enabling NOx reduction with considerable efficiency. To put such SCR technology in place it is necessary to place on board the vehicle a reducing agent for reduction of nitrogen oxides.

The SCR system currently used by heavy-goods vehicles uses urea in an aqueous solution as reducing agent. Injected into the exhaust, urea decomposes by the effect of temperature of the exhaust gas into ammonia (NH3) and allows reduction of NOx on a specific catalyst. An aqueous solution of urea standardised for operation of systems currently in SCR series is referenced AUS32 (the commercial name in Europe is Adblue®). This method is subject to some limitations. It exhibits limited cold efficiency (engine not yet warm). Such a situation occurs in several cases, especially for city buses.

Also, the urea tank has substantial mass and volume, typically 15 to 30 L for a particular vehicle, 40 to 80 L for a heavy-goods vehicle. Such bulk causes complexity of integration in the vehicle which is all the greater since the vehicle is small. This results in high decontamination costs, and surplus mass to the detriment of fuel consumption of the vehicle and therefore of $CO_2$ emissions.

Alternative storage methods have therefore been planned to try to overcome these limitations. The option consisting of storing gas under pressure in an empty tank also has disadvantages, especially in terms of compactness and operation safety. This applies especially to the storage of gaseous ammonia.

Another method consists of storing gas inside a storage material, in which the gas is absorbed. This storage material, for example salt, is arranged in a storage enclosure. The storage of gas (typically ammonia which is the example to be developed here, but this principle applies to the storage of other gases) is done in salt by formation of a chemical complex of ammoniate type.

The following paragraph gives more detail on the chemical process of ammonia sorption in material such as salt. In a storage structure, a powdered salt is selected from alkaline earth chlorides as storage material. In particular, powdered salt can be selected from the following compounds: $SrCl_2$, $MgCl_2$, $BaCl_2$, $CaCl_2$, $NaCl_2$.

The storage of ammonia in such a storage material is based on reversible solid-gas reaction of type:

$$\langle\text{Solid A}\rangle + (\text{Gas}) \leftrightarrows \langle\text{Solid B}\rangle$$

The ammonia forms coordination complexes with the alkaline earth chlorides, also called ammoniates. The skilled person knows this phenomenon.

For example, reactions of ammonia with the strontium chloride are:

$$SrCl_2(s) + NH_3(g) \leftrightarrows Sr(NH_3)Cl_2(s)$$

$$Sr(NH_3)Cl_2(s) + 7NH_3(g) \leftrightarrows Sr(NH_3)_8Cl_2(s)$$

Similarly, the unique reaction of ammonia with barium chloride is:

$$BaCl_2(s) + 8NH_3(g) \leftrightarrows Ba(NH_3)_8Cl_2(s)$$

The chemical absorption of the ammonia binder by the absorbent $SrCl_2$ and $BaCl_2$ causes, between the solid and the gas, a transfer of electrons which occurs via chemicals bonds between $NH_3$ and the external layer of atoms of $SrCl_2$ and $BaCl_2$. The penetration of gas into the structure of the solid occurs in its entire mass by a diffusion method. This reaction is reversible, absorption being exothermal and desorption endothermal.

This type of storage has advantages. Storage in salt in fact significantly reduces mass and volume of the storage tank. It also provides a benefit in terms of $CO_2$ balance due to the decrease in reducer mass to be embedded for given autonomy of ammonia. Relative to the storage of urea in aqueous solution, in fact the extra quantity of water provided to dilute the urea in the classic configuration of the SCR is saved. Also, this type of storage uses cold $NO_x$ absorption with higher efficiency. This type of storage also enables a reduction in manufacturing costs since the supply system and injection of the ammonia can be simplified.

The focus throughout this text will be on this type of storage. To limit the bulk of the storage enclosure, car manufacturers use filling or replacement of the storage enclosure, for example during maintenance, at the time of emptying, or during filling of the fuel tank. According to currently held hypotheses, the quantity of ammonia embedded on board a particular vehicle will be of the order of 6 kg for an equivalent of 16 Liters of a solution of urea of type AUS32, which ensures autonomy of the particular vehicle between two emptying intervals of the vehicle. To allow supply of an SCR system with ammonia, a heating element is provided, electrical or via a coolant fluid for example, controlled so as to release in doses in each condition of use, ammonia intended for processing of nitrogen oxides.

In an envisaged embodiment, once the storage enclosure (for example a cartridge—these two terms 'enclosures' and 'cartridge' can be used in this text) is empty, it is replaced by a full cartridge, for example during vehicle maintenance, the empty cartridge being sent to a filling station. A cartridge could undergo from ten to fifteen emptying/filling cycles. According to the strategies of manufacturers, the frequency of exchange of storage enclosures and their modalities of exchange could be modulated.

The storage of ammonia in the form of absorbed gas therefore has advantages relative to an aqueous solution of Adblue (gain in volume, increased cold efficiency, more compactness of the mixing area with the exhaust gas, . . . ). The aim of the invention is to further improve known SCR systems.

In particular, different aspects of the invention aim to contribute a solution to at least one of the following problems:

Overcoming to some degree the contradiction inherent to known devices, between the search for minimal gas pressure in the storage enclosure, and minimisation of power (typically of electrical origin) necessary to release the stored gaseous ammonia, The difficulty in gauging the level of gas, which is stored in a solid matrix. In this respect, planning of the exchange of empty cartridges by full cartridges would be considerably facilitated if it were possible to gauge the level of said cartridges over time, The heterogeneity set progressively in the cartridge by the process of emptying said cartridges over the life of the system. This progressive emptying will in fact induce progressive heterogeneity in the storage matrix, which could cause evolution in system performance. In due course this can also cause a change in the inherent characteristics of this matrix, and consequently durability problems.

To provide at least one of these solutions, the invention proposes an ammonia storage structure especially for selective catalytic reduction of nitrogen oxides in the exhaust gas of combustion vehicles, comprising at least one storage material in which ammonia can be stored, characterized in that it comprises at least two separate storage parts, each storage part containing storage material, the storage materials of the different storage parts not all being identical.

Advantageous, but non-limiting, aspects of such a structure are the following:

the different storage materials have different sorption enthalpies, the different storage materials have different porosities, or different distributions of sizes of pores, the different storage materials have different thermal conductivities, at least some of the storage materials are in powdered form, at least some of the storage materials are in the form of rigid elements, the materials are selected from alkaline earth chlorides, in particular in the form of salt of $SrCl_2$, $MgCl_2$, $BaCl_2$, $CaCl_2$, or $NaCl_2$, the storage parts are arranged adjacent to each other and means are provided to enable circulation of gaseous ammonia between two adjacent storage parts, the structure comprises means enabling circulation of gaseous ammonia between two adjacent storage parts, said means enabling the circulation of gaseous ammonia between two adjacent storage parts are controlled to control circulation of gaseous ammonia between two adjacent storage parts, said means enabling circulation of gaseous ammonia between two adjacent storage parts are controlled obturating means, to enable circulation of gaseous ammonia between two adjacent storage parts the structure comprises a gas transport device such as a conduit or a diffuser, to enable circulation of gaseous ammonia between two adjacent storage parts, the structure comprises an intermediate element fitted with holes or whereof the porosity allows diffusion of the gaseous ammonia, at least one storage part contains a heating element, the heating element is an electrical resistor.

The invention also relates to an ammonia storage and destocking system of a vehicle comprising a storage enclosure, the storage enclosure comprising a storage structure according to one of the aspects hereinabove.

The invention also relates to a control method of a storage structure of an ammonia storage and destocking system as described previously, the method comprising:

a first control step of the heating element of the first storage part so as to release ammonia stored in the first storage part, and a second monitoring step of the quantity of ammonia released by the first storage part and/or of the quantity of ammonia stored in the first storage part.

The variation in the quantity of ammonia of the first storage part can be monitored independently of the second storage part, in particular since ammonia is stored in the second storage part without the second storage part releasing stored ammonia.

Advantageous, but non-limiting, aspects of such a method are the following:

in response to an indication by the sensor of the first storage part that the quantity of stored ammonia is less than a given threshold, a third step for release of the ammonia stored in the second storage part;

the third step comprises controlling a heating element of the second storage part so as to release ammonia stored in the second storage part;

the third step comprises opening control of controlled obturating means separating the first storage part from the second storage part;

a fourth step for monitoring the quantity of ammonia released by the second storage part and/or the quantity of ammonia stored in the second storage part.

The invention also relates to a system of selective catalytic reduction for internal combustion engine exhaust gas, comprising an ammonia storage system such as mentioned hereinabove and a module for injection ammonia into the exhaust gas. According to an advantageous, but non-limiting aspect, the system of selective catalytic reduction for exhaust gas of an internal combustion engine comprises control means configured to use a control method such as described previously.

BRIEF DESCRIPTION OF THE FIGURES

Other characteristics, aims and advantages of the invention will emerge from the description hereinbelow of the invention. In the appended drawings.

DETAILED DESCRIPTION

General Architecture of the SCR Post-Processing System

Figure 1:
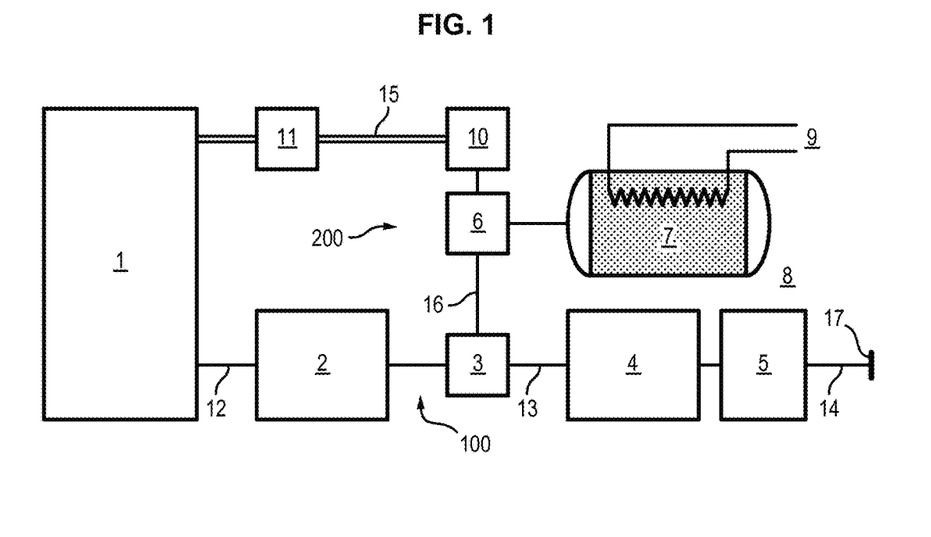
FIG. 1 illustrates a thermal engine equipped with a SCR post-processing system by injection of ammonia according to the invention.

FIG. 1 schematically illustrates a thermal engine 1 equipped with an SCR post-processing system by injection of ammonia. The thermal engine can be an internal combustion engine, a diesel engine for example, or a lean-burn petrol engine such as a stratified direct injection engine.

The engine 1 is controlled by an electronic computer 11 which regulates its operation. As they leave the engine, exhaust gases 12 are directed to a decontamination device 2. The decontamination device 2 can comprise an oxidation catalyst or a three-way catalyst. The decontamination system can also comprise a particle filter.

Gaseous ammonia 16 is injected at the level of an exhaust circuit 100 of the engine, leaving the engine, this ammonia being mixed with the exhaust gas by means of an injection module 3 arranged for example downstream of the decontamination device 2 to form an ammonia/exhaust gas mixture 13. The ammonia/exhaust gas mixture 13 then passes through an SCR catalyst 4 which enables reduction of NOx by ammonia. Complementary post-processing elements 5 can be positioned after the SCR catalyst. The complementary elements 5 can comprise a particle filter or an oxidation catalyst.

The exhaust gases are in the form of decontaminated exhaust gas 14 at output from the complementary elements 5. The decontaminated exhaust gases are then sent to an exhaust outlet 17. In this way the exhaust circuit 100 comprises the decontamination element 2, the injection module 3, the catalyst SCR 4, and optionally the complementary elements 5 arranged from upstream, engine side 1, to downstream, exit side 17.

To ensure supply and dosage of the ammonia 16 entering the injection module 3, the system comprises an ammonia storage enclosure 8 containing a storage structure 7 intended to store ammonia and release it in gaseous form. The structure 7 can be temperature-controlled by a reheating device 9. The reheating device 9 comprises for example an electrical resistor or a heat exchanger fed by coolant fluid such as the cooling liquid of the engine. The structure 7 can comprise ducts for conveying ammonia from the exterior of the enclosure 8 to the ammonia storage parts (comprising storage materials, to be described) and/or in the opposite direction.

The storage enclosure 8 is preferably connected to a pressure control device 6 of the enclosure and dosage of the ammonia to the injection module 3. This device 6 can be controlled by a dedicated electronic controller 10 connected to the electronic computer 11 of the engine. The system thus comprises an ammonia supply circuit 200 comprising, from upstream to downstream in the direction of circulation of ammonia, the storage enclosure 8, the device 6, and the injection module 3 in the exhaust 100. In an alternative configuration not shown here the device 6 can be directly controlled by the engine computer 11.

The Structure Comprises at Least Two Different Storage Parts

In the case of the invention, the ammonia storage structure 7 comprises not only storage material, in which ammonia can be stored, but also at least two separate storage parts, each storage part containing storage material. The ammonia storage structure comprises for example at least three storage parts. As will become evident, all storage parts are capable of releasing gaseous ammonia they contain in the same conditions. In other words, some storage parts are configured to release their gaseous ammonia more easily than other storage parts, even by initially containing the same quantity of ammonia as the other parts.

The at least two storage parts, or plurality of storage parts, is typically included in a storage structure arranged in a storage enclosure, such that the plurality of storage parts is arranged in the enclosure. The first storage part can be associated with a monitoring sensor of the quantity of ammonia stored in the first storage part. Such a sensor is for example a dedicated pressure sensor. The second storage part can be connected to a monitoring sensor of the quantity of ammonia stored in the second storage part. Such a sensor is for example a dedicated pressure sensor.

For a clear explanation of two main embodiments the simple case in which the structure comprises two storage parts will be illustrated. It is however possible that the structure comprises any number of storage parts, greater than or equal to two.

Two main modes according to which the storage parts can separately release their ammonia will now be explained. These two modes can be executed independently of each other and can also be combined. According to a first mode which will be detailed, this faculty for separate release of ammonia is obtained by ensuring that the storage materials in the two storage parts are different. According to a second mode which will be detailed, this faculty for separate release of ammonia is obtained by ensuring that the storage materials in the two storage parts are heated separately. Prior to the description of these two main modes, a few physical principles should be recalled.

Figure 2:
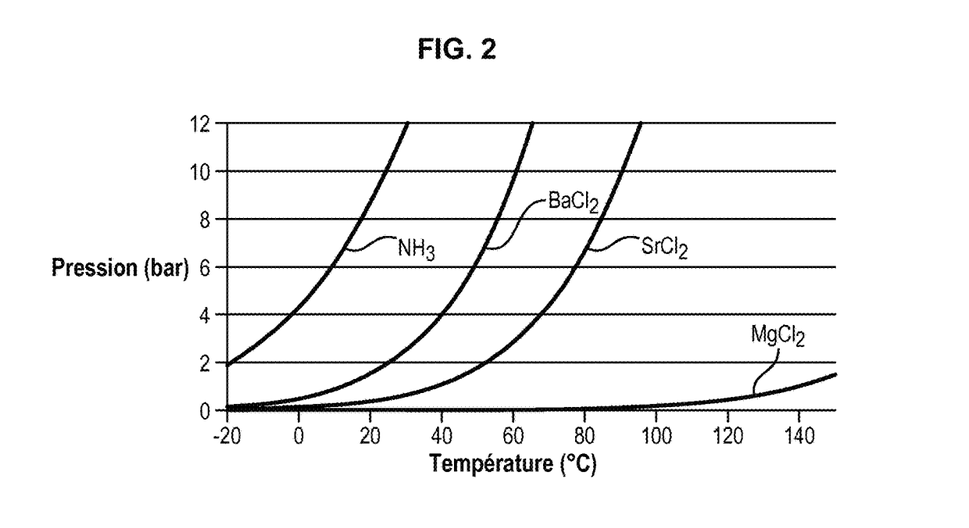
FIG. 2 illustrates the collection of characteristic pressure/temperature curves, curves known as Clausius/Clapeyron, for different salts which can be used for storage by absorption of the ammonia.

FIG. 2 illustrates characteristic pressure/temperature curves, curves known as Clausius/Clapeyron for different salts which can be used for storage by absorption of ammonia. These curves illustrate, for a given quantity of ammonia, that for a given temperature the limit pressure stability of the ammonia NH3 when this ammonia is fixed to different media. In the free state, the ammonia will be at a certain pressure given by the curve $NH_3$.

When the ammonia is fixed in a solid matrix composed of some salts, the ammonia remains absorbed stably in the salt and, as a function of temperature some of the ammonia can be outside the solid matrix of the salt, in gaseous form, at a certain pressure. As a function of the salt used as storage material of ammonia for the solid matrix, the capacity to retain a more or less large quantity of ammonia in absorbed form will be different. Therefore, salt $MgCl_2$ has a capacity greater than that of salt $SrCl_2$, and greater again than that of salt $BaCl_2$. At 40° C. for example, salt $MgCl_2$ retains ammonia absorbed in its solid matrix, whereas for the same quantity of ammonia the salt $SrCl_2$ can fix only some of the ammonia in absorbed form in the solid matrix of the salt, the rest of the ammonia being in gaseous form, setting a pressure (of a value of the order of 1 bar). The salt $BaCl_2$ as such has an even less absorption capacity such that for the same total quantity of ammonia and still for 40° C., the gaseous ammonia is in larger quantity and a pressure of almost 6 bars prevails.

The storage material $MgCl_2$ is stabler than the material $SrCl_2$, in turn stabler than the material $BaCl_2$. The invention advantageously exploits these characteristics, according to the two modes which will be described on the basis of a simple configuration with only two storage parts. The invention can also exploit differences between storage materials which do not relate to the chemical compositions of the materials, but their porosity, or more generally their capacity to transport gas trapped in the material—this capacity being in particular determined by the size distribution of pores in the material.

First Main Mode: Use of Different Storage Materials

According to a first main embodiment, the two storage parts can separately release their ammonia as they respectively enclose two different storage materials. The notion of different materials will be defined more precisely in this section. Storage materials are typically salts, which can by in powdered form, or again in pre-compressed form, forming a rigid element or rigid elements. The storage materials are preferably selected from the alkaline earth chlorides, in particular in the form of salt of $SrCl_2$, $MgCl_2$, $BaCl_2$, $CaCl_2$, or $NaCl_2$.

To have storage materials which can separately release their ammonia, it is feasible especially to:
  Use chemically different materials (by selecting two different compositions, for example in the list hereinabove). In this case the different storage materials have different thermodynamic properties (typically sorption enthalpies),
  Use the same material, but with two porosities, or more generally two different capacities for transporting gas trapped in the material, this capacity being in particular determined by the size distribution of pores in the material
    In this respect, a powdered salt will have a different rheology, and consequently will have different behaviour, to material of the same chemical composition as will have been compressed previously, for example to make of it a rigid element of compressed salt (which can be in the form of a wafer),
    Other methods of differentiating the properties of a material, for example by carrying out sintering under different temperature conditions of two samples of the same salt can be planned.

Therefore, it is possible to fill (or "charge") each of the different storage parts with the same quantity of ammonia, and each of these parts will release its ammonia differently, as a function of the storage material included in the storage part, even when the different parts are at the same temperature. As will become evident later in this text, the storage parts can also exchange gaseous ammonia with each other, where this ammonia can circulate from one storage part to the other (freely, or controlled). By choice of different storage materials, this first main embodiment selectively and differently releases the ammonia stored in the different parts.

Second Main Mode: Differentiated Heating of Storage Parts

According to a second first main embodiment, the two storage parts can release their ammonia separately as they are heated separately. In this case, each storage part contains a heating element. The heating element is typically an electrical resistor, put into contact with, or placed near the storage part to be heated. In all cases each heating element is controlled individually to selectively increase the temperature of the storage part to which it is connected. As a consequence, the temperature of the storage material contained in the storage part will in turn be increased selectively.

It is possible for example to ensure that the electrical resistances associated respectively with different storage parts, have different resistance values. In this case a heating power differential can be set between different storage parts particularly simply, by supplying the resistances by a single source of electric energy. To set a temperature differential between storage parts it is also possible to use the differences in thermal conductivity between the storage materials of these different parts. This second mode therefore constitutes second means for the two storage parts to release their ammonia separately.

Communication Between the Storage Parts

Whether with the first main mode, the second main mode, or with a mixed mode (in which storage parts comprise different storage materials, and further storage parts are heated selectively), the storage parts (any number of them) are arranged adjacently to each other, preferably in series. These storage parts can be separated from each other by walls (permeable to gas or not) which segment the internal space of the structure 7. The storage parts can also be attached to each other without intermediate walls.

Means are provided to enable circulation of gaseous ammonia between two adjacent storage parts. This gaseous ammonia, which originates from a storage part, has been released by said storage part while other storage parts were able to release a different quantity of gaseous ammonia, or not release any at all (as a function of the storage material, and/or of the heating applied to the storage part).

The means enabling circulation of gaseous ammonia between two adjacent storage parts can be controlled to control circulation of gaseous ammonia between two adjacent storage parts. In this case these means enabling circulation of gaseous ammonia between two adjacent storage parts can be controlled obturating means. In particular, the controlled obturating means can for example enable circulation of gaseous ammonia between the two adjacent storage parts or prevent such circulation as a function of an opening or closing command of the controlled obturating means.

In a simplified configuration, the means enabling circulation of gaseous ammonia between two adjacent storage parts can also be "passive" means, for example in the form of a gas transport device such as a conduit or a diffuser. To enable circulation of gaseous ammonia between two adjacent storage parts it is also possible for the structure to comprise an intermediate element fitted with holes or whereof the porosity allows diffusion of the gaseous ammonia. It is even possible to put the two storage materials of two adjacent storage parts directly in contact so as to create in the structure 7 regions in which the gaseous ammonia will be more or less concentrated, wherein this ammonia can circulate directly between the two regions in contact.

By way of example, FIG. 3 illustrates different ways of connecting two storage parts together. It is specified in FIG. 3 that the different properties of the materials are obtained by different chemical compositions (different sorption enthalpies). But the architectures and principles illustrated in FIG. 3 are also applicable when the properties different of the materials are obtained by different thermal arrangements (different heating and/or different porosities).

Figure 3A:
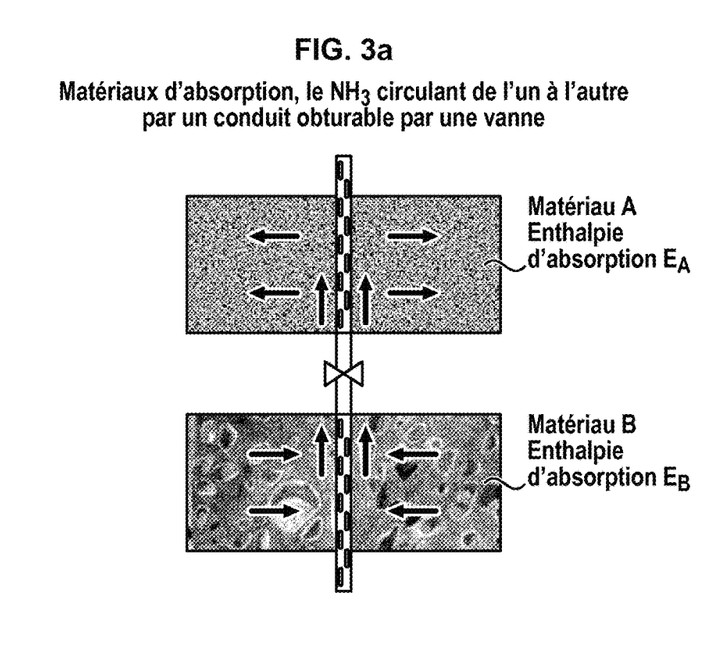
FIG. 3 illustrates different ways of connecting two storage parts together.

In FIG. 3a, storage characteristic material a, defining a first storage part, is separated from other material of characteristic b, defining a second storage part, by a conduit allowing flow of ammonia, blockable by a valve controlled from a computer 11 of FIG. 1. The flow of ammonia from one storage part to the other can occur in either direction. Each of the storage materials in this example is located in two separate containers, where the two materials can alternatively be implanted in two compartments separated by a partition.

Figure 3B:
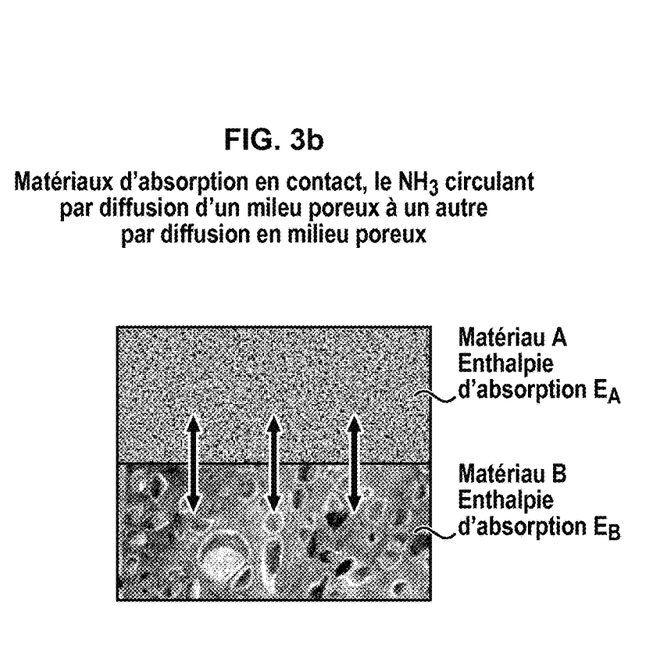
Figure 3C:
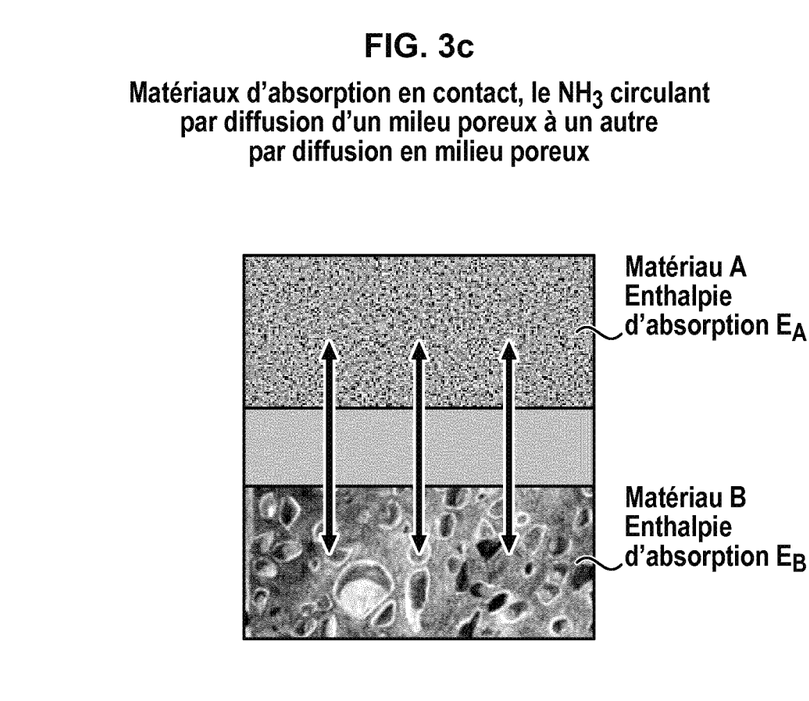

In FIG. 3b, the two storage materials of two storage parts are in direct contact, the flow from one to the other occurring via the porosities of the two materials. In FIG. 3c, the two materials of the two storage parts are separated by a permeable membrane enabling circulation of the ammonia in either direction.

A permeable membrane separating two storage parts is for example a separation layer made of material whereof the permeability relative to circulation of the ammonia can vary as a function of the state of the separation layer. In particular, as a function of the state of the separation layer, the latter can have permeability having different values, for example, as a function of this state of the separation layer, substantially enable circulation of ammonia or substantially prevent it. It is possible to modify the flow of ammonia within the storage structure, or conserve ammonia stored in a given storage part, and constitute a reserve of ammonia or better control the quantity of gaseous ammonia produced by heating.

The separation layer is for example connected to a heating element. Such a heating element is for example the heating element of a storage part which the separation layer separates. Alternatively, such a heating element is for example a separate dedicated heating element of any heating element of a storage part of the storage structure or of several heating elements of storage parts of the storage structure.

Such a separation layer can for example itself enable storage of ammonia. It is possible to get the advantages of a separation layer between different storage parts and use the space occupied by the separation layer for storage of ammonia. The separation layer for example has a volumic storage capacity of ammonia less than that of the storage parts.

Such a separation layer comprises for example material having a chemical composition common with at least one of the storage layers which the separation layer separates, for example with two of the separated storage layers, the material having different granulometry or a different compression rate, typically a greater compression rate. It is thus possible to easily make a separation layer, for example by strongly compressing a storage layer during formation of the storage structure.

The separation layer comprises for example graphite or can be constituted by graphite. The graphite has the advantage of having permeability to ammonia varying with the temperature and able to store ammonia. Also, a graphite separation layer, connected to a heating element, precisely controls the flow of ammonia from the second storage part.

Complements to the System

The invention also proposes an ammonia storage and destocking system of a vehicle comprising a storage enclosure, with a storage enclosure comprising a storage structure according to one or more of the aspects described hereinabove. It also proposes a system of selective catalytic reduction for exhaust gas of an internal combustion engine, comprising such an ammonia storage system and an injection module of ammonia into the exhaust gas.

Figure 4:
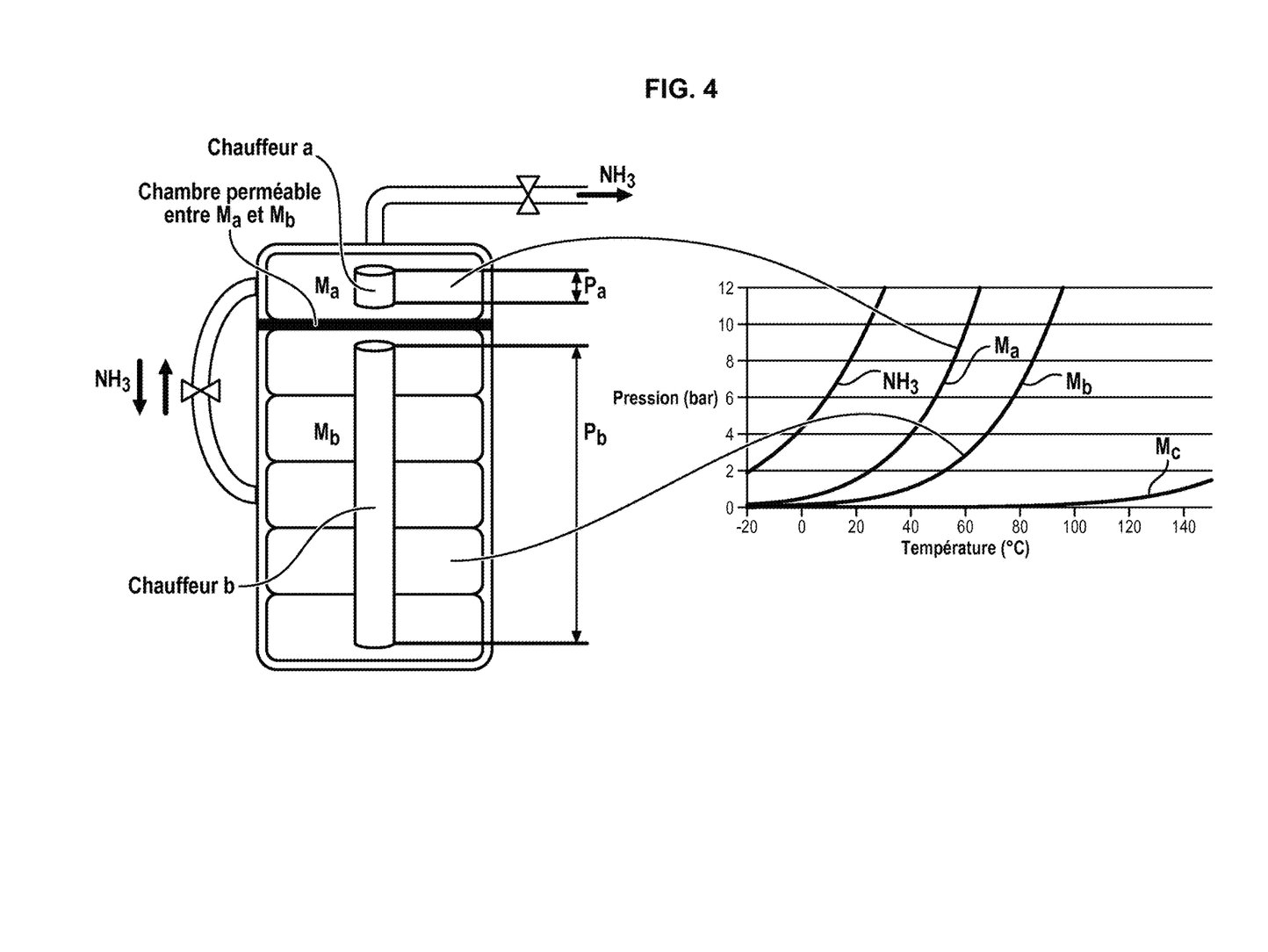
FIG. 4 illustrates a storage system according to the invention, which aims to ensure a compromise between electric heating power consumed and transport safety of unitary cartridges from the production factories to assembly points fitted new or after market.

FIG. 4 illustrates a hybrid storage system ensuring a compromise between the electric heating power consumed and transport safety of unitary cartridges from the production factories to the assembly points, fitted new or after market. In fact, advantageously in the case of the invention the storage matrix of the storage structure is made mainly with storage material(s) for example maintaining pressure less than or equal to 1 bar absolute, that is, which can be considered as a "solid" by way of regulations on transport of dangerous goods. Only a certain region Mb of the storage structure (corresponding to one or more storage parts is occupied by storage material having lesser stability, that is, at equivalent temperature allowing greater saturation pressure, and therefore having greater reactivity relative to the injection of ammonia into the exhaust line.

Managing the distribution of ammonia between the different parts of the cartridge consists for example of leaving the least stable storage matrix Mb empty or barely empty of ammonia during the transport phases of the structure (which will constitute a cartridge for example). Once the cartridge is installed in the system and connected to a controller such as the element 11 of FIG. 1, a valve connecting the two regions Ma, Mb of the cartridge is activated to open it, and (via the device 9 of FIG. 1) the stablest storage material can further be heated selectively to set a temperature, and accordingly pressure, differential with the least stable material. Accordingly, the difference in pressure between the two regions of the cartridge causes the flow of gaseous ammonia between them, and the ammonia invests the least stable region (the most reactive).

Gaseous saturation of this region in ammonia is supported, such that this region is ready to be injected into the exhaust under highly favourable conditions of reactivity and electric energy savings (little energy has been spent for the heating initiating this reaction). It will be provided advantageously that the least stable region is arranged in the cartridge in the immediate proximity of the outlet of the cartridge which feeds the element 6 of FIG. 1, to feed the exhaust line 100 with gaseous ammonia. In this way, during transport of the packaged cartridges to the system in which they are to be installed, the stablest storage parts of the cartridge contain ammonia in a concentration greater than the other storage parts, which are nearer the output of the cartridge.

When the cartridge is on station in the system, the stablest storage parts can be activated (by selective heating), increasing the pressure of gaseous ammonia in these parts, and this ammonia is released to the least stable parts of the cartridge. These least stable parts (because they contain storage material less stable than the stablest parts) are those from which it is easier to sample ammonia, and they are the parts which preferably have been arranged immediately near the feed output of the cartridge to the exhaust of the engine.

The control member such as a valve between the stable and least stable parts is preferably controlled to prevent reversible recirculation of the ammonia towards the stablest material. In this respect an adapted opening sequence of the valves will be provided by:

Activating the stablest parts so that they release gaseous ammonia,

Opening fluidic communication between these stable parts and the least stable parts so as to "load" the least stable parts with ammonia until brought to pressure reaching a pressure value capable of feeding the exhaust line of the engine, or near this pressure value, Closing this communication to prevent return of ammonia to the stablest parts, Activating by heating the least stable parts to further increase the ammonia pressure so as to feed the exhaust line.

Application to Gauging

Figure 5:
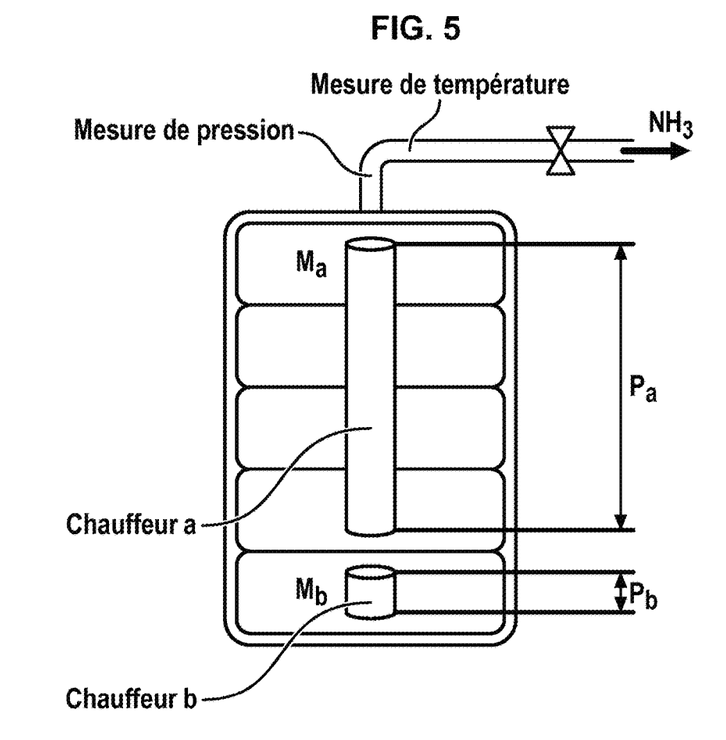
FIG. 5 illustrates a hybrid storage system and its control for performing discrete gauging of the cartridge over time.

FIG. 5 illustrates a hybrid storage system and its control for performing gauging of the cartridge over time. For example, a part Ma of the cartridge comprises a barely stable salt, adapted for injection of ammonia into the exhaust at the cost of activation by reduced electric energy. As for FIG. 4, a part Mb of the cartridge is filled with stabler material.

The two parts Ma and Mb can be separated by a wall sealed against gaseous ammonia. The stabler part Mb is initially saturated in ammonia and therefore can no longer collect ammonia. Each part Ma, Mb, is connected to a respective heating circuit which can release respective heating power Pa, Pb.

A pressure sensor is further arranged for measuring the pressure prevailing at the level of the part Ma. This part preferably corresponds to a single volume. In operation, the heating circuit of the part Ma is activated to activate the material of this part to diffuse gaseous ammonia, towards the exhaust line. The pressure in the part Ma is measured continuously, or at regular intervals.

Following emission of ammonia out of the cartridge from the part Ma, the pressure in this part will tend to drop. The drop in pressure will become significant when the ammonia trapped in the material of the part Ma will be exhausted, since the heating of the part Ma would remain activated. Before this exhaustion the drop in pressure will be limited as the material of the part Ma will stay activated and will release its ammonia. By monitoring the pressure in the part Ma, it is possible to detect exhaustion of the ammonia in this part.

It is specified that during the ammonia release phase by the part Ma, the part Mb is not activated (that is, it is not heated to the point where it releases its ammonia). The ammonia which is stored there remains in reserve. When exhaustion of ammonia of the part Ma is detected, this part Mb is activated by means of the heating of the part Mb. It releases its ammonia, going to the part Ma. In practice, detection of this "passage on the reserve" constituted by the part Mb is used as alert marker indicating the necessity to proceed with replacement or recharging of the cartridge.

Example of Control Method

Figure 6:
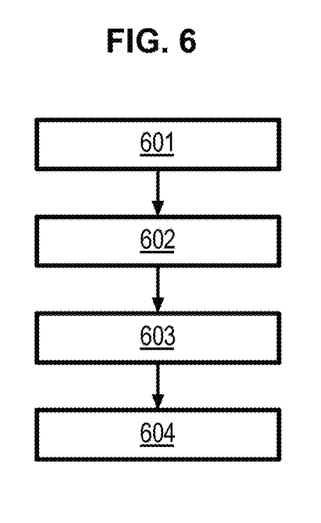
FIG. 6 illustrates an example of a control method according to an example of an embodiment of the invention.

In reference to FIG. 6, this describes a control method of a storage structure such as described previously, for example of a storage structure of a storage system such as described previously. The storage structure comprises at least one first storage part and one second storage part. The first storage part is connected to flow means of gaseous ammonia to the storage structure and/or out of the storage structure. The first storage part can be connected to a respective heating element in terms of releasing its ammonia.

The method can comprise a first step 601 for controlling the heating element of the first storage part so as to release ammonia stored in the first storage part, the release of ammonia being typically selective such that the ammonia stored in the second storage part is not released. The method can comprise a second step 602 for monitoring the quantity of ammonia released by the first storage part and/or of the quantity of ammonia stored in the first storage part. This step can be conducted during release of ammonia or consecutively to the release of ammonia.

To enable such monitoring, the first storage part can be connected to a monitoring sensor of the quantity of ammonia stored in the first storage part. Such a sensor is for example a dedicated pressure sensor. Variation in the quantity of ammonia of the first storage part can be monitored independently of the variation of the quantity of ammonia of the second storage part, in particular since ammonia is stored in the second storage part without the second storage part releasing stored ammonia. It is possible to entirely exhaust the first storage part and keep the ammonia stored in the second storage part in reserve.

The method can in particular comprise a third step 603 for release of ammonia stored in the second storage part, in response to an indication by the sensor of the first storage part that the quantity of ammonia stored is less than a given threshold, typically the quantity of ammonia stored by the first storage part is zero. Such a third step 603 can for example comprise controlling a heating element of the second storage part so as to release the ammonia stored in the second storage part, the release of ammonia being typically selective such that the ammonia stored in the second storage part is released independently of the first storage part.

Alternatively or in addition, such a third step 603 can comprise an opening command of controlled obturating means separating the first storage part from the second storage part. As indicated previously, the obturating means are typically formed by a controlled separation layer, typically a layer comprising graphite. Such an opening command can for example be given jointly with release of the ammonia stored in the second storage part, for example when the obturating means comprise a separation layer to which the same heating element is connected as that of the second storage part or a separate heating element.

The method can comprise a fourth step 604, consecutive for example, for monitoring the quantity of ammonia released by the second storage part and/or of the quantity of ammonia stored in the second storage part. The variation in quantity of ammonia of the second storage part can be monitored independently of the first storage part. It is possible to get more precise gauging of the quantity of ammonia in the storage structure.

In fact, according to the prior art, gauging is typically done by a flow meter at an output of the storage enclosure. Measuring quantity according to the prior art is delicate and liable to impreciseness since it needs to precisely and permanently monitor the flow. Also, such a measure according to the prior art does not monitor the quantity of ammonia stored in case of a leak.

On the contrary, such a method put in place at the level of such a structure enables fine monitoring of the quantity of ammonia in each storage part and a command for more precisely managing the release of ammonia. It is especially possible to prevent the structure from being emptied too quickly or limit the quantities of ammonia released needlessly in the event of considerable need of ammonia followed by a sudden stoppage of that need. In the prior art, heating the entire storage structure implies that if the demand for ammonia is suddenly stopped, and with the structure already heated, it will continue to empty as it is delicate obturating the output of ammonia released in gaseous form for safety reasons.

The system according to the invention for example expects that the quantity of ammonia of a given storage part has been sufficiently emptied before control of the release of ammonia from the following storage part. So, if there is no more need following a first command involving major release of ammonia, only the first storage part is likely to empty, the other part retaining its ammonia, preferably because of the obturating means, and even more particularly due to the separation layer. Also, such a method associated with such a system better meters the release of ammonia as needed. Since the storage parts are separated, it is possible to release the stored ammonia only in one of them. The more the structure contains separate storage parts, the more precise the control can be.

In particular, it is possible to know the quantity of ammonia stored in the different storage parts and therefore in particular to know the precise placement of any leak in the enclosure. In particular, when the storage parts are separated by controlled obturating means, it is possible to prevent all ammonia from being released in the event of leaking. In particular, the storage structure can be connected to control means configured to execute such a control method.

The system of selective catalytic reduction for exhaust gas of an internal combustion engine comprises for example such control means. The control means comprise for example a dedicated electronic controller 10 connected to the electronic computer 11 of the engine or are included in the electronic computer 11.

The invention claimed is:

1. A system for storage and destocking of ammonia of a vehicle, the system comprising:
a storage structure for the ammonia;
at least one storage material for storing the ammonia within the storage structure, wherein the storage structure comprises at least two separate storage parts, each storage part containing one of said at least one storage materials, wherein the storage material of each of the at least two storage parts is a different storage material;
at least one monitoring sensor independently monitoring a quantity of the ammonia stored in at least one of the at least two separate storage parts;
said at least one of said at least two separate storage parts including a heater element which operates to independently and selectively release the ammonia stored in said at least one of said at least two separate storage containers.

2. The system of claim 1 wherein the different storage materials have different sorption enthalpies.

3. The system of claim 1 wherein the different storage materials have at least one of different porosities, different distributions of sizes of pores and different thermal conductivities.

4. The system of claim 1 wherein at least two of the at least one storage materials are in a powdered form.

5. The system of claim 1 wherein two of the storage parts are adjacent to each other and the ammonia circulates between the two adjacent storage parts.

6. The system of claim 1 wherein the ammonia circulates between at least two of the storage parts.

7. The system of claim 6 further comprising one of a dedicated electronic controller configured and a general purpose computer programmed to control circulation of the ammonia between two adjacent storage parts.

8. The system of claim 7 further comprising at least one of a conduit, diffuser, element fitted with holes, a valve and a layer of graphite configured to control circulation of the ammonia between the two adjacent storage parts.

9. The system of claim 8 further comprising a gas transporter including one of: a conduit or a diffuser, circulating the ammonia between two adjacent storage parts of the at least two separate storage parts, and an intermediate layer or material including holes or porosity to allow diffusion of the ammonia.

10. The system of claim 1, wherein the heating element is an electrical resistor.

11. The system of claim 1, wherein at least two of the storage parts are attached to each other without an intermediate wall therebetween.

12. The system of claim 1, wherein:
the storage materials of each of the at least two storage parts are separated by a permeable membrane enabling circulation of the ammonia between each of the at least two storage parts in either direction;
the permeable membrane separating each of the at least two storage parts is a separation layer such that permeability relative to circulation of the ammonia varies as a function of a state of the separation layer; and
as a function of the state of the separation layer, the latter has permeability having different values.

13. The system of claim 12, wherein the different values of permeability enable or prevent circulation of ammonia.

14. The system of claim 1, wherein at least some of the storage materials are rigid.

15. The system of claim 1, wherein the vehicle includes a combustion engine operably emitting exhaust gas which interacts with the ammonia.

16. The system of claim 1, wherein the system operates to provide selective catalytic reduction of nitrogen oxides in exhaust gas emitted by the vehicle.

17. The system of claim 1, wherein the at least one monitoring sensor comprises:
a first monitoring sensor monitoring the ammonia in a first of the at least two separate storage parts; and
a second monitoring sensor monitoring the ammonia in a second of the at least two separate storage parts.

18. The system of claim 1, wherein the at least one monitoring sensor comprises a separate pressure sensor monitoring the quantity of the ammonia in each of the separate storage parts, the system further comprising a dedicated electronic controller connected to the sensors configured to allow one of the storage parts to be emptied of the ammonia prior to emitting the ammonia stored in another of the storage parts.

19. The system of claim 1, wherein each of the storage parts includes a heating electrical resistor, contacting with, or placed adjacent to the storage part to be heated, and electrical resistances associated respectively with the different storage parts having different resistance values.

20. The system of claim 1, wherein the ammonia circulates as a gas between the separate storage parts through a permeable separation layer.

21. The system of claim 1, wherein the ammonia circulates as a gas between the separate storage parts through a membrane separating the separate storage parts.

22. The system of claim 1, wherein the ammonia circulates as a gas between the separate storage parts through an intermediate partition having holes therethrough.

23. The system of claim 1, wherein the ammonia circulates as a gas between the separate storage parts through a separation layer including graphite.

24. The system of claim 1, wherein the ammonia circulates as a gas between the separate storage parts through a conduit blockable by a valve controlled by an electrical controller connected with the at least one monitoring sensor.

25. The system of claim 1, wherein the ammonia circulates between the separate storage parts at least in part due to different absorption enthalpies of the storage materials in the separate storage parts.

26. The system of claim 1, further comprising:
an internal combustion engine; and
an injector;
the injector operably injecting the ammonia into exhaust gas from the engine for selective catalytic reduction of the exhaust gas.

27. The system of claim 1, further comprising a dedicated electronic controller configured to control movement of the ammonia between the separate storage parts in response to the at least one monitoring sensor.

28. The system of claim 1, wherein the at least one monitoring sensor comprises a separate pressure sensor monitoring the quantity of the ammonia in each of the separate storage parts, the system further comprising a general purpose computer connected to the sensors and programmed to allow one of the storage parts to be emptied of the ammonia prior to emitting the ammonia stored in another of the storage parts.

29. The system of claim 1, further comprising a general purpose computer programmed to control movement of the ammonia between the separate storage parts in response to the at least one monitoring sensor.

30. A control method for storage and destocking of ammonia of a vehicle including a storage structure for storing the ammonia, wherein the storage structure includes at least two separate storage parts, each storage part containing a storage material, wherein the storage material of each the at least two storage parts is a different storage material;
the method comprising:
controlling a heating element of a first of the at least two separate storage parts so as to selectively release only the ammonia stored in the first storage part; and
separately monitoring a quantity of the ammonia stored in each of the at least two separate storage parts with a monitoring sensor; and
releasing the ammonia stored in a second storage part, in response to an indication by the monitoring sensor of the first storage part that the quantity of the ammonia stored in said first storage part is less than a given threshold or is zero.

31. The method of claim 30, further comprising:
selectively applying a catalytic reduction of exhaust gas of an internal combustion engine of said vehicle; and
injecting the ammonia, by use of an injector, in the exhaust gas.

32. The method of claim 31, further comprising controlling the ammonia moving between the at least two storage parts in response to the monitoring sensors associated with each of the at least two storage parts.

33. A control method for ammonia in a vehicle comprising a vehicular storage structure for storing ammonia, the vehicular storage structure comprising at least two separate storage parts, each storage part containing a storage material, wherein the storage material of each the at least two storage parts is a different storage material,
the method comprising:
controlling heating of a first of the at least two separate storage parts so as to selectively release the ammonia stored in the first storage part;
monitoring a quantity of the ammonia released by and/or stored in the first storage part; and
allowing the ammonia to move from a first salt in the first storage part, through a permeable or porous material, to a second and different salt in a second of the at least two storage parts.

* * * * *